(12) United States Patent
Dar et al.

(10) Patent No.: US 11,895,066 B2
(45) Date of Patent: Feb. 6, 2024

(54) REAL-TIME CHAT SERVICE FILE TRANSFER ACROSS DIFFERENT NETWORKS

(71) Applicant: T-Mobile Innovations LLC, Overland Park, KS (US)

(72) Inventors: Sheraz F. Dar, Maple Valley, WA (US); Zakir Hussain Syed, Bellevue, WA (US); Aditi Ranjit Kumar Verma, Lynnwood, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 17/591,433

(22) Filed: Feb. 2, 2022

(65) Prior Publication Data
US 2023/0246985 A1    Aug. 3, 2023

(51) Int. Cl.
| | |
|---|---|
| *G06F 15/16* | (2006.01) |
| *H04L 51/046* | (2022.01) |
| *H04L 67/06* | (2022.01) |
| *H04L 51/10* | (2022.01) |
| *H04L 67/563* | (2022.01) |

(52) U.S. Cl.
CPC ............ *H04L 51/046* (2013.01); *H04L 51/10* (2013.01); *H04L 67/06* (2013.01); *H04L 67/563* (2022.05)

(58) Field of Classification Search
None
See application file for complete search history.

(56) References Cited

U.S. PATENT DOCUMENTS

| | | | | |
|---|---|---|---|---|
| 2008/0170677 A1* | 7/2008 | Kutt | ...................... | H04L 61/106 |
| | | | | 379/142.04 |
| 2009/0077227 A1* | 3/2009 | Force | ...................... | H04L 63/30 |
| | | | | 709/224 |
| 2009/0313256 A1* | 12/2009 | Konduri | ................ | G06F 16/951 |
| | | | | 707/E17.115 |
| 2014/0108568 A1* | 4/2014 | Lee | ...................... | H04L 65/4015 |
| | | | | 709/227 |
| 2016/0072745 A1* | 3/2016 | Kubik | ................. | H04L 61/4555 |
| | | | | 709/206 |
| 2017/0272316 A1* | 9/2017 | Johnson | ................ | H04L 61/301 |

(Continued)

FOREIGN PATENT DOCUMENTS

| | | | | |
|---|---|---|---|---|
| CN | 113934994 A | * | 1/2022 | |
| CN | 115525307 A | * | 12/2022 | ......... G06F 12/0246 |

(Continued)

*Primary Examiner* — Yves Dalencourt

(57) ABSTRACT

A method of completing RCS file transfer. The method comprises receiving a first SIP message comprising a first URL designating a file stored in a first message store in a first network by an RCS server in a second network; sending the first URL by the RCS server to a second message store in the second network; identifying a second URL by the second message store, wherein the second URL is to be associated with the first URL by a proxy server; sending the first URL and the second URL by the second message store to the proxy server; sending the second URL by the second message store to the RCS server; and sending a second SIP message comprising the second URL by the RCS server to a communication device, whereby the communication device is enabled to request a file from the proxy based on the second URL.

18 Claims, 10 Drawing Sheets

(56) References Cited

U.S. PATENT DOCUMENTS

| | | | |
|---|---|---|---|
| 2018/0139247 A1* | 5/2018 | Lin | H04L 51/04 |
| 2020/0099789 A1* | 3/2020 | Miller | H04L 61/4535 |
| 2020/0304574 A1* | 9/2020 | Gupta | G06F 3/0604 |

FOREIGN PATENT DOCUMENTS

| | | | | |
|---|---|---|---|---|
| EP | 3313037 A1 * | 4/2018 | | H04L 29/06 |
| EP | 3531670 A1 * | 8/2019 | | H04L 43/08 |
| WO | WO-2010050817 A1 * | 5/2010 | | G06F 17/30899 |
| WO | WO-2012022357 A1 * | 2/2012 | | H04L 12/4633 |

* cited by examiner

REAL-TIME CHAT SERVICE FILE TRANSFER ACROSS DIFFERENT NETWORKS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Short message service (SMS) messages may be carried over wireless communication networks among cell phone users. Multimedia message service (MMS) is another variation of messaging carried over wireless communication networks. Some wireless communication service providers are providing forms of real-time chat which involves an on-going session where chat partners are synchronized with each other, while SMS text messages and MMS messages are asynchronous in nature.

SUMMARY

In an embodiment, a method of completing real-time chat service (RCS) file transfer is disclosed. The method comprises receiving a first message comprising a first uniform resource locator (URL) designating a file stored in a first message store in a first communication network by a real-time chat session (RCS) server in a second communication network and sending the first URL by the RCS server to a second message store in the second communication network. The method further comprises identifying a second URL by the second message store, wherein the second URL is to be associated with the first URL by a proxy server, sending the first URL and the second URL by the second message store to a proxy server, sending the second URL by the second message store to the RCS server, and sending a second message comprising the second URL by the RCS server to a communication device, whereby the communication device is enabled to request a file from the proxy based on the second URL.

In another embodiment, a method of completing real-time chat service (RCS) file transfer is disclosed. The method comprises receiving a first uniform resource locator (URL) designating a file stored in a first message store in a first communication network and a second URL by a proxy server from a second message store in a second communication network, creating a mapping from the second URL to the first URL by the proxy server, and storing the mapping from the second URL to the first URL by the proxy server. The method further comprises receiving a request for a file transfer by the proxy server from a communication device engaged in a real-time chat session, wherein the request comprises the second URL, in response to receiving the request for the file transfer, looking up the first URL by the proxy server based on the second URL, retrieving a file stored at the first message store by the proxy server based on the first URL, returning the retrieved file by the proxy server to the communication device engaged in the real-time chat session, and storing the retrieved file by the proxy server in a cache.

In yet another embodiment, a method of completing real-time chat service (RCS) file transfer is disclosed. The method comprises receiving a first request for a file by a first mStore associated with a first wireless communication carrier, wherein the first request comprises a uniform resource locator (URL) associated with the file, sending a second request for the file by the first mStore to a second mStore based on the URL, wherein the second mStore is associated with a second wireless communication carrier different from the first wireless communication carrier, receiving the file by the first mStore from the second mStore, and storing the file by the first mStore. The method further comprises receiving a third request for the file from a third mStore by the first mStore, where the third mStore is not authorized to connect to the second mStore and where the third mStore is associated with a third wireless communication carrier different from the first wireless communication carrier and different from the second wireless communication carrier and returning the file by the first mStore to the third mStore, whereby RCS file transfer is enabled between a first communication device receiving wireless communication service from the first wireless communication carrier, a second communication device receiving wireless communication service from the second wireless communication carrier, and a third communication device receiving wireless communication service from the third wireless communication carrier.

In yet another embodiment, a method of completing real-time chat service (RCS) file transfer is disclosed. The method comprises receiving a first uniform resource locator (URL) designating a file stored in a first message store in a first communication network by a second message store in a second communication network, sending the first URL by the second message store to a proxy server, creating a mapping from a second URL to the first URL by the proxy server, and storing the mapping from the second URL to the first URL by the proxy server. The method further comprises receiving a request for a file transfer by the proxy server from a communication device engaged in a real-time chat session, wherein the request comprises the second URL, in response to receiving the request for the file transfer, looking up the first URL by the proxy server based on the second URL, retrieving a file stored at the first message store by the proxy server based on the first URL, and returning the retrieved file by the proxy server to the communication device engaged in the real-time chat session.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
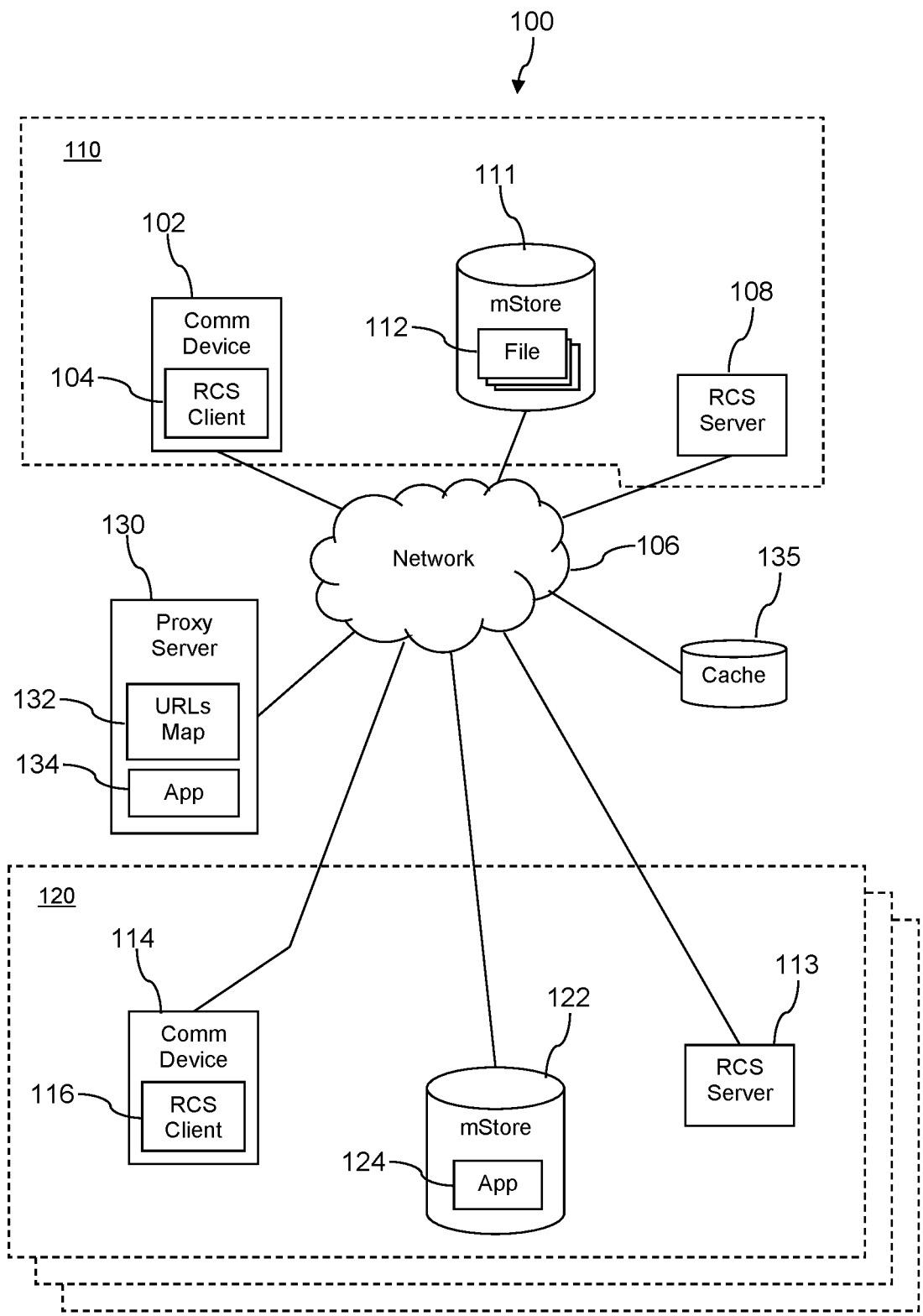
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Realtime chat service (RCS) provides a real-time session using in part a message session relay protocol (MSRP). Some of this communication involves sharing files. To accomplish this conventionally, the file is deposited in an mStore, a link to the stored file is returned to the RCS participant, and the link is sent to one or more other participants in the chat session. Those participants (or the RCS clients executing on the participants' communication devices) use the link to retrieve the file stored at the mStore. When the participants are subscribed to different carriers (e.g., different wireless communication service providers), often the carriers don't want their users encountering URLs directed to others' networks. Hence, if a first RCS participant in a first carrier network wants to share a file and sends a URL designating the file stored in the mStore supported by the first carrier network to a second RCS participant in a second carrier network, the RCS server of the second carrier network maps the URL associated with the mStore of the first carrier network instead to a URL in an mStore of the second carrier network, and it is this URL that is provided to the second RCS participant. The second RCS participant requests the file using the second URL; the mStore of the second carrier network maps this second URL to the original URL; fetches the content via a call to the first mStore; stores the content locally; and returns the content to the second RCS participant. This is very clunky and inefficient. This requires every carrier's mStore to maintain links and connectivity with every other mStore. It requires a lot of duplication of files.

The present disclosure teaches a proxy service that supports localized links to content for each different carrier, such that each different carrier network needs to connect their mStore only to the proxy and NOT to each of the other mStores. This is a clean solution that provides many benefits and several efficiency improvements—both reduced network traffic and reduced memory storage. In particular, only the mapping of source URL to local URLs of each different carrier network need be stored in the proxy not the actual file content. This relieves the secondary mStores from storing the file content also. A participant requests the content using the secondary URL directly from the proxy; the proxy maps the secondary URL to the source URL and sends a request for the file to that source URL (e.g., to the mStore in the first carrier network); the content is then returned to the proxy; and the proxy returns the content to the participant (but without storing, only transferring the content, like a router in effect).

In an embodiment, a carrier can designate how long the proxy is to maintain a mapping of a source URL to the local URL associated with that carrier. For example, when sending a source URL to the proxy for creating and storing an association of that source URL to a local URL, the mStore of a carrier can designate an expiration date and time. This expiration could reflect the expiration of the content at the source mStore or the expiration of the URL mapping.

In an embodiment, the proxy provides a cache which stores content retrieved from source mStores transiently, for example for 3 minutes or less, for 5 minutes or less. Such a cache can be provided with minimum resources and can reduce network traffic when more than two participants are engaged in RCS file sharing.

In an embodiment, RCS file sharing may be performed in a different way. Communication devices receiving wireless communication service from different carriers may retrieve the file using a local reference or URL directed to an mStore that is local to its own carrier. The local mStore may retrieve the file from a source mStore (e.g., the mStore where the RCS participant seeking to share the file originally stored it) in another carrier's network. But if this source mStore is unreachable by a local mStore—as for example if this connection is not approved or pre-configured—the local mStore may request the file instead from an mStore of a different carrier that is connected to the source mStore.

Restating the above, sharing files in an RCS system across different carriers using conventional methods results in inefficiencies of communication network utilization and memory storage. This technical problem of sharing files in an RCS system is resolved by the technical solution described herein that uses a proxy that manages mapping of source URLs to local URLs, whereby carriers avoid their subscribers seeing URLs directed to other networks. The local RCS server sends the source URL to the local mStore, the local mStore sends the source URL to the proxy, the proxy maps the source URL to a local URL (where the local URL is generated either by the proxy or by the local mStore), the local mStore returns the local URL to the local RCS server, and the local RCS server sends the local URL to the participant device. If the participant device wants to retrieve the file, the RCS client on the participant device requests the content using the local URL which resolves to the proxy. The proxy maps the local URL to the source URL and retrieves the content from the source mStore based on the source URL. The proxy then returns the content (e.g., the shared file) to the RCS client of the participant. If the participant does not act to receive the file, the file does not needlessly traverse the network. Additionally, the content of the file is not duplicated at the local mStore. In an embodiment, it may be more efficient for the proxy to temporarily cache a shared file that it has retrieved, for example when there may be a plurality of RCS participants that may download the shared file. This can reduce the burden on the source mStore and can reduce network traffic. It is understood that this process of using a proxy to avoid full-mesh networking among sharing data stores may advantageously be applied to other systems besides an RCS system.

Turning now to FIG. 1, a system 100 is described. In an embodiment, system 100 comprises a first communication device 102 that executes a first real-time chat session (RCS) client 104, a network 106, a first RCS server 108, and a first mStore 111 that stores one or more shared files 112. The first communication device 102, the first RCS server 108, and the first mStore 111 may be located in a first carrier network domain 110. The network 106 comprises one or more public networks, one or more private networks, or a combination thereof. The system 100 further comprises a second communication device 114 that executes a second RCS client 116, a second RCS server 113, and a second mStore 122 that executes an mStore application 124. The second communication device 114, the second RCS server 113, and the second mStore 122 may be located in a second carrier network domain 120. The system 100 further comprises a proxy server 130 that stores a URL map 132 and that executes a proxy application 134. The RCS servers 108, 113, and the proxy server 130 may be implemented by computer systems. The mStores 111, 122 may comprise secondary storage as well as a computer system. Computer systems are described further hereinafter. In an embodiment, the proxy server 130 maintains a cache 135 that may be implemented as secondary storage or as main memory in the computer system implementing the proxy server 130.

In an embodiment, there may be a plurality of communication devices within the first carrier network domain 110. In an embodiment there may be a plurality of communications within the second carrier network domain 120. In an embodiment, there may be other carrier domains similar to that of the second carrier network domain 120. The communication devices 102, 114 may be engaged in a RCS chat session, and the first communication device 102 may share a file with the second communication device 114 and optionally with other communication devices that are a party to the same RCS chat session. The first communication device 102 may be a mobile phone, a smart phone, a personal digital assistant (PDA), a wearable computer, a headset computer, a laptop computer, a notebook computer, or a tablet computer. While the first communication device 102 is illustrated as linked to the network 106 by a solid line, it is understood that the first communication device 102 is provided a first wireless link by a cell site (not shown) in the first carrier network domain 110, and the cell site is communicatively coupled to the network 106. Likewise, while the second communication device is illustrated as linked to the network 106 by a solid line, it is understood that the second communication device 114 is provided a second wireless link by a cell site (not shown) in the second carrier network domain 120, and the cell site is communicatively coupled to the network 106. The second communication device 114 may be a mobile phone, a smart phone, a PDA, a wearable computer, a headset computer, a laptop computer, a notebook computer, or a tablet computer. The first wireless link may be provided to the first communication device 102 by the cell site in the first carrier network domain 110 according to a 5G, a long-term evolution (LTE), a code division multiple access (CDMA), or a global system for mobile communications (GSM) telecommunication protocol. The second wireless link may be provided to the second communication device 114 by the cell site in the second carrier network domain 120 according to a 5G, a long-term evolution (LTE), a code division multiple access (CDMA), or a global system for mobile communications (GSM) telecommunication protocol.

Figure 2:
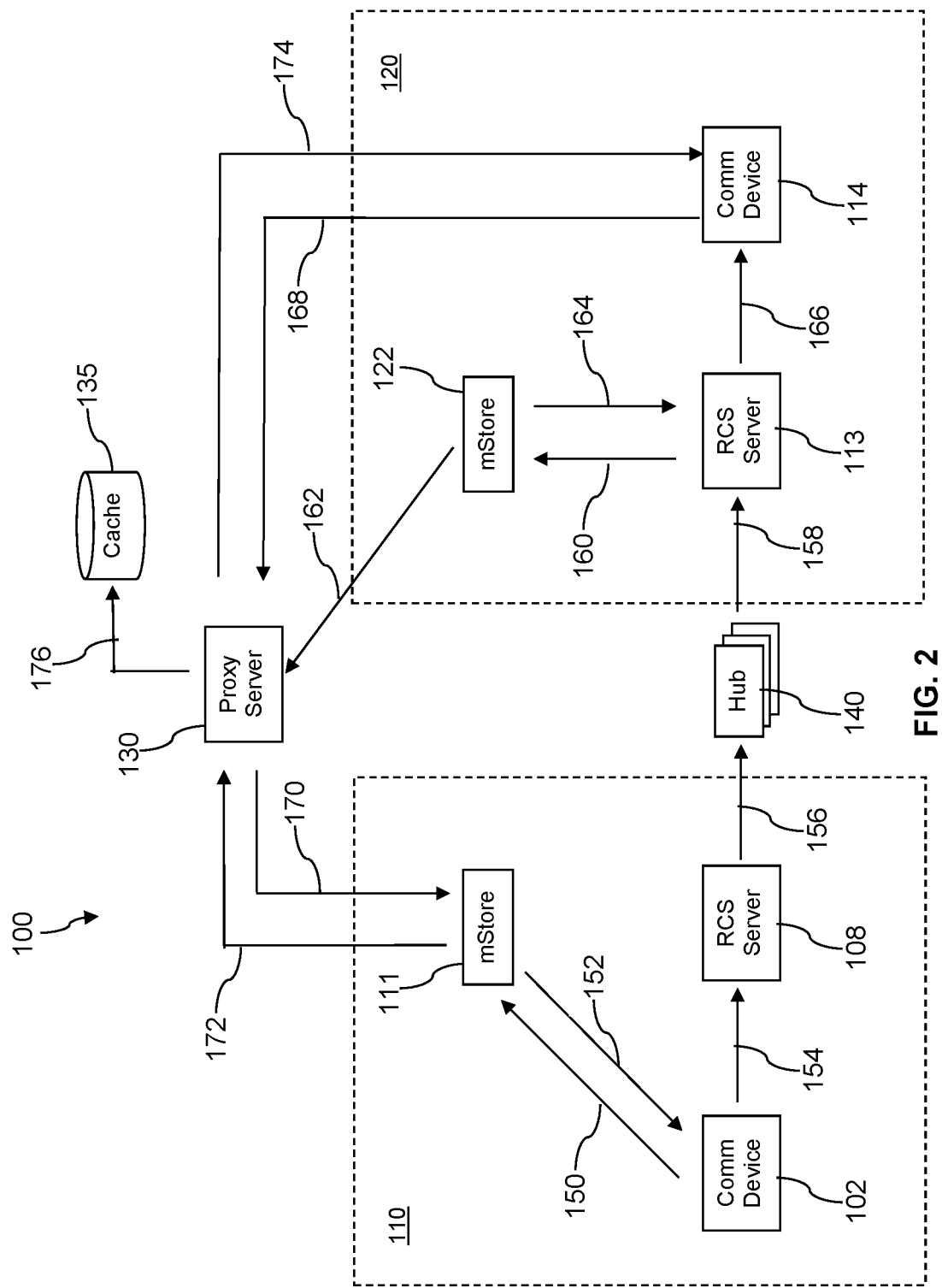
FIG. 2 is a block diagram of a flow of communication according to an embodiment of the disclosure.

Turning now to FIG. 2, and still with reference to FIG. 1, a flow of messages within the communication system 100 is described. The first communication device 102 is engaged in a RCS with the second communication device 114. The users of the devices 102, 114 may view and provide input to a user interface on the devices 102, 114 provided by the RCS client 104, 116. The first communication device 102 (e.g., the first RCS client 104) interacts with the first RCS server 108, which interacts with the second RCS server 113, and the second RCS server 113 interacts with the second communication device 114 (e.g., the second RCS client 116). In an embodiment, the RCS servers 108, 113 communicate via one or more hubs 140 that provides communications connectivity. The flow of RCS messages is understood to flow both from the first communication device 102 to the second communication device 114 but also flow from the second communication device 114 to the first communication device 102. The flow of messages in FIG. 2 are particularly directed to illustrate the first communication device 102 sharing a file with the second communication device 114. The shared file may be any content stored in a file, for example a video stored in a file.

When the user of the first communication device 102 indicates to the first communication device 102 (e.g., the first RCS client 104) that he or she wants to share a designated file with the second communication device 114, the RCS client 104 sends a message 150 to the first mStore 111 comprising the file to be shared. The first mStore 111 stores the shared file, generates a uniform resource locator (URL) that designates the shared file, and returns the URL in a message 152 to the first communication device 102 (e.g. to the first RCS client 104). This URL designating the shared file in the first mStore 111 may be referred to as the source URL.

The first communication device 102 (e.g., the first RCS client 104) sends a message 154 comprising the source URL to the first RCS server 108. The first RCS server 108 sends a message 156 comprising the source URL to the hub 140. The hub 140 sends a message 158 comprising the source URL to the second RCS server 113.

The second RCS server 113 sends a message 160 comprising the source URL to the second mStore 122. In an embodiment, the mStore application 124 executing at the second mStore 122 generates a local URL that is associated with the second carrier network domain 120 (e.g., the local URL comprises a domain name that associates to the second carrier network domain 120). The second mStore 122 sends a message 162 to the proxy server 130 comprising the source URL and the local URL. In another alternative, however, the second mStore 122 does NOT generate the local URL and sends the message 162 to the proxy server 130 comprising the source URL and NOT comprising the local URL. In this alternative, the proxy server 130 generates the local URL that is associated with the second carrier network domain 120 and sends the local URL to the second mStore 122. In both alternatives, the proxy server 130 creates a mapping of or an association of the local URL to the source URL and stores this association in the URL map 132. It is understood that the URL map 132 may comprise a plurality of such maps or associations of local URLs to source URLs. In an embodiment, the proxy server 130 may send a reply message to the second mStore 122 indicating the success of the creation of a local URL to source URL map.

The second mStore 122 sends a message 164 comprising the local URL to the second RCS server 113. The second RCS server 113 sends a message 166 comprising the local URL to the second communication device 114 (e.g., to the second RCS client 116). The second communication device 114 (e.g., the second RCS client 116) sends a message 168 comprising the local URL to the proxy server 130. It is understood that the message 168 requests that a shared file be fetched and returned to the second RCS client 116 for presentation to a user of the second communication device 114.

The proxy server 130 looks up the association of the local URL received from the second RCS client 116 to the source URL stored in response to receiving message 162 from the second mStore 122. The proxy server 130 sends a message 170 comprising the source URL to the first mStore 111 requesting the shared file. In an embodiment, the proxy server 130 simply sends a message requesting a file to the source URL, and the data communication network (e.g., a portion of the network 106) looks up an IP address based on the source URL and routes the request to that looked up IP address. Alternatively, in an embodiment, the proxy server 130 maintains connectivity with a plurality of mStores 111, 122 in different carrier network domains and recognizes the first mStore 111 based on the source URL designating the first carrier network domain 110.

The first mStore 111 looks up the shared file 112 based on the source URL received in message 170 and sends the shared file 112 in message 172 back to the proxy server 130. The proxy server 130 sends the shared file 112 in message 174 back to the second communication device 114 (e.g., to the second RCS client 116). The second communication device 114 (e.g., the second RCS client 116) presents the shared file 112 in a display of the second communication device 114 or stores it in memory of the second communication device 114.

In an embodiment, the proxy server 130 also sends a message 176 comprising the shared file 112 to the cache 135 for storing temporarily. If a third communication device (not shown) requests a shared file that is stored in the cache 135, the proxy server 130 may retrieve a copy of the shared file from the cache 135 and send that to the third communication device. In an embodiment, the proxy server 130 deletes the shared file 112 from the cache 135 after a predefined duration of time, for example after 5 minutes, after 10 minutes, after 15 minutes, after 20 minutes, after 30 minutes, after 45 minutes, after 60 minutes, or after some other relatively short duration of time. In an embodiment, the proxy server 130 deletes the shared file 112 from the cache 135 based on a tenure of shared files stored in the cache 135. For example, when space in the cache 135 is running out, the cache 135 or the proxy server 130 may delete first the oldest cached file, then the second oldest cached file, then the third oldest cached file until a desired amount of free memory space is created in the cache 135.

Figure 3:
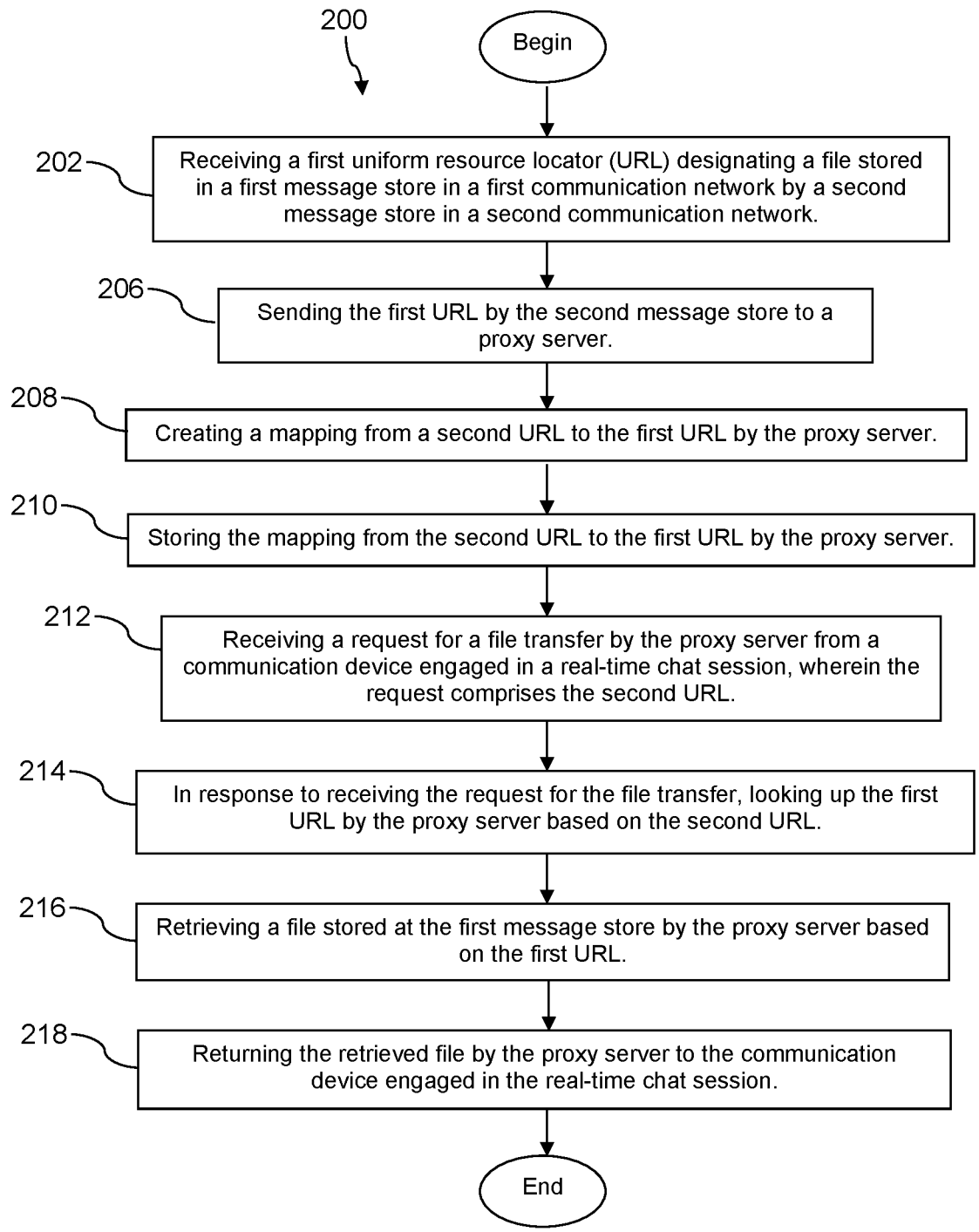
FIG. 3 is a flow chart of a method according to an embodiment of the disclosure.

Turning now to FIG. 3, a method 200 is described. In an embodiment, the method 200 is a method of completing real-time chat service (RCS) file transfer. At block 202, the method 200 comprises receiving a first uniform resource locator (URL) designating a file stored in a first message store in a first communication network by a second message store in a second communication network. In an embodiment, the processing of block 202 is preceded by receiving the first URL by a RCS server in the second communication network and sending the first URL by the RCS server to the second message store. In an embodiment, the first communication network is a first wireless communication network and the second communication network is a second wireless communication network.

At block 206, the method 200 comprises sending the first URL by the second message store to a proxy server. In an embodiment, the second message store generates a second URL that designates a location in the domain of the second communication network and sends the second URL with the first URL to the proxy server.

At block 208, the method 200 comprises creating a mapping from a second URL to the first URL by the proxy server. In an embodiment, the proxy server generates the second URL and the second URL designates a location in the domain of the second communication network. At block 210, the method 200 comprises storing the mapping from the second URL to the first URL by the proxy server. In an embodiment, the method 200 further comprises, sending the second URL by the second message store to the RCS server, receiving the second URL by the RCS server from the second message store, and transmitting the second URL by the RCS server to the communication device.

At block 212, the method 200 comprises receiving a request for a file transfer by the proxy server from a communication device engaged in a real-time chat session, wherein the request comprises the second URL. In an embodiment, the communication device is a mobile phone, a smart phone, a personal digital assistant (PDA), a wearable computer, a headset computer, a laptop computer, a notebook computer, or a tablet computer. At block 214, the method 200 comprises, in response to receiving the request for the file transfer, looking up the first URL by the proxy server based on the second URL.

At block 216, the method 200 comprises retrieving a file stored at the first message store by the proxy server based on the first URL. In an embodiment, the method 200 further comprising caching by the proxy server the file retrieved from the first message store. At block 218, the method 200 comprises returning the retrieved file by the proxy server to the communication device engaged in the real-time chat session.

In an embodiment, the method 200 further comprises receiving the first uniform resource locator (URL) designating the file stored in the first message store in the first communication network by a third message store in a third communication network; identifying a third URL by the third message store; sending the first URL and the third URL by the third message store to the proxy server; creating a mapping from the third URL to the first URL by the proxy server; storing the mapping from the third URL to the first URL by the proxy server; receiving a request for a file transfer by the proxy server from a second communication device engaged in a real-time chat session, wherein the request comprises the third URL; in response to receiving the request for the file transfer, looking up the first URL by the proxy server based on the third URL; retrieving the file stored at the first message store by the proxy server based on the first URL; and returning the retrieved file by the proxy server to the second communication device engaged in the real-time chat session.

In an embodiment, the method 200 further comprises receiving the first uniform resource locator (URL) designating the file stored in the first message store in the first communication network by a third message store in a third communication network; identifying a third URL by the third message store; sending the first URL and the third URL by the third message store to the proxy server; creating a mapping from the third URL to the first URL by the proxy server; storing the mapping from the third URL to the first URL by the proxy server; receiving a request for a file transfer by the proxy server from a second communication device engaged in a real-time chat session, wherein the request comprises the third URL; in response to receiving the request for the file transfer, looking up the first URL by the proxy server based on the third URL; retrieving the file from the cache by the proxy server based on the first URL; and returning the retrieved file by the proxy server to the second communication device engaged in the real-time chat session.

Figure 4:
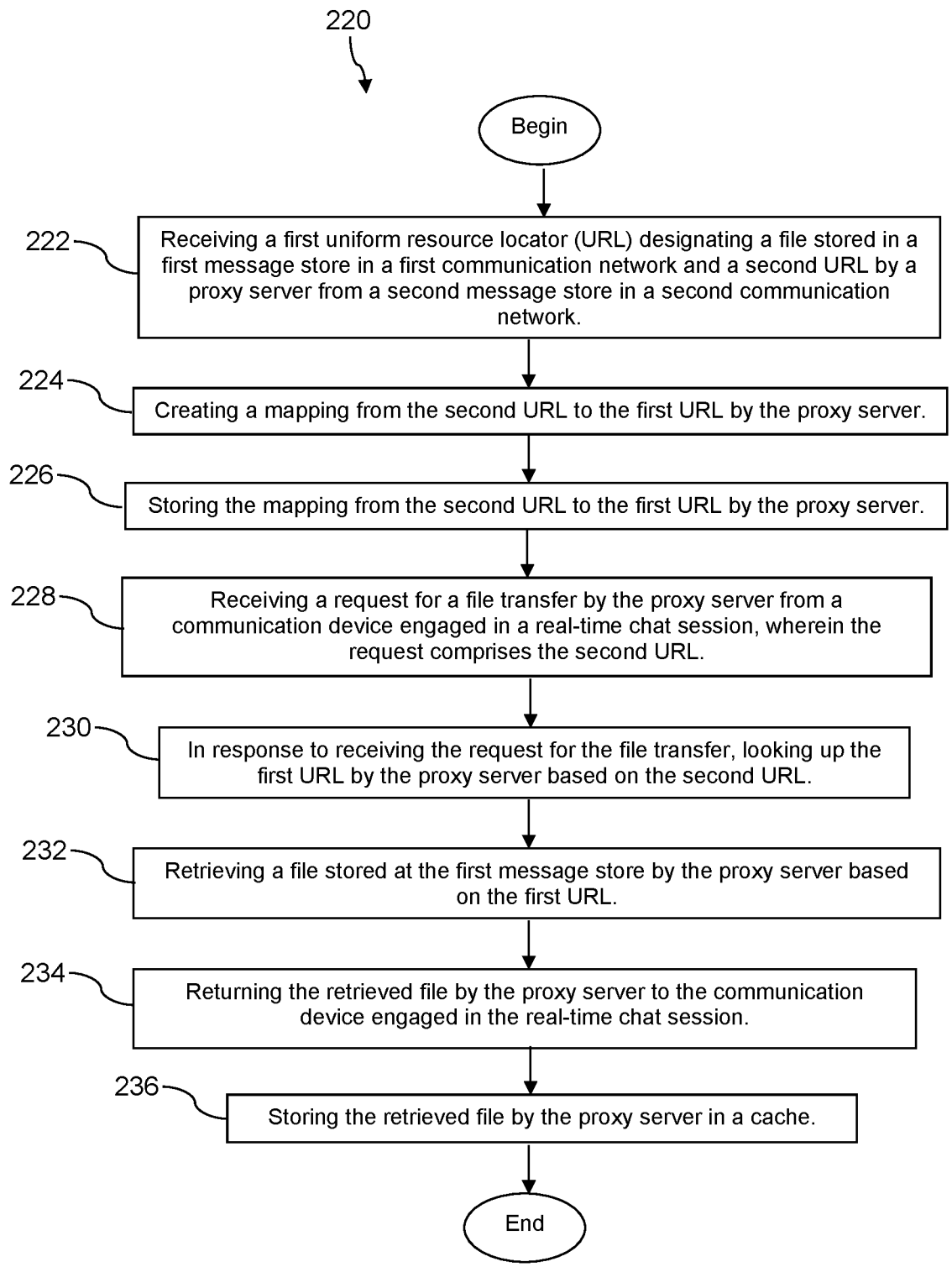
FIG. 4 is a flow chart of another method according to an embodiment of the disclosure.

Turning now to FIG. 4, a method 220 is described. In an embodiment, the method 220 is a method of completing real-time chat service (RCS) file transfer. At block 222, the method 220 comprises receiving a first uniform resource locator (URL) designating a file stored in a first message store in a first communication network and a second URL by a proxy server from a second message store in a second communication network. In an embodiment, the first communication network is a first wireless network, the second communication network is a second wireless network and the third communication network is a third wireless network. In an embodiment, the file is a video file (e.g., a file that stores video content). In an embodiment, the file is at least 80 MB in size and less than 1 GB in size. In an embodiment, the file is at least 90 MB in size and less than 1 GB in size. In an embodiment, the file is at least 100 MB in size and less than 1 GB in size. In an embodiment, the method 220 comprises receiving a time-out value by the proxy server along with the first URL and the second URL, wherein the mapping from the second URL to the first URL comprises the time-out value.

At block 224, the method 220 comprises creating a mapping from the second URL to the first URL by the proxy server. At block 226, the method 220 comprises storing the mapping from the second URL to the first URL by the proxy server.

At block 228, the method 220 comprises receiving a request for a file transfer by the proxy server from a communication device engaged in a real-time chat session, wherein the request comprises the second URL. At block 230 the method 220 comprises, in response to receiving the request for the file transfer, looking up the first URL by the proxy server based on the second URL.

At block 232, the method 220 comprises retrieving a file stored at the first message store by the proxy server based on the first URL. At block 234, the method 220 comprises returning the retrieved file by the proxy server to the communication device engaged in the real-time chat session. At block 236, the method 220 comprises storing the retrieved file by the proxy server in a cache.

In an embodiment, the method 220 further comprises receiving the first URL and a third URL by the proxy server from a third message store in a third communication network; creating a mapping from the third URL to the first URL by the proxy server; storing the mapping from the third URL to the first URL by the proxy server; receiving a second request for a file transfer by the proxy server from a second communication device engaged in a real-time chat session, wherein the request comprises the third URL; in response to receiving the second request for the file transfer, looking up the first URL by the proxy server based on the third URL; retrieving the file from the cache by the proxy server; and returning the retrieved file by the proxy server to the second communication device engaged in the real-time chat session.

In an embodiment, the method further comprises determining by the proxy server that the time-out value of the mapping from the second URL to the first URL has expired; and deleting the mapping from the from the second URL to the first URL by the proxy server.

Figure 5:
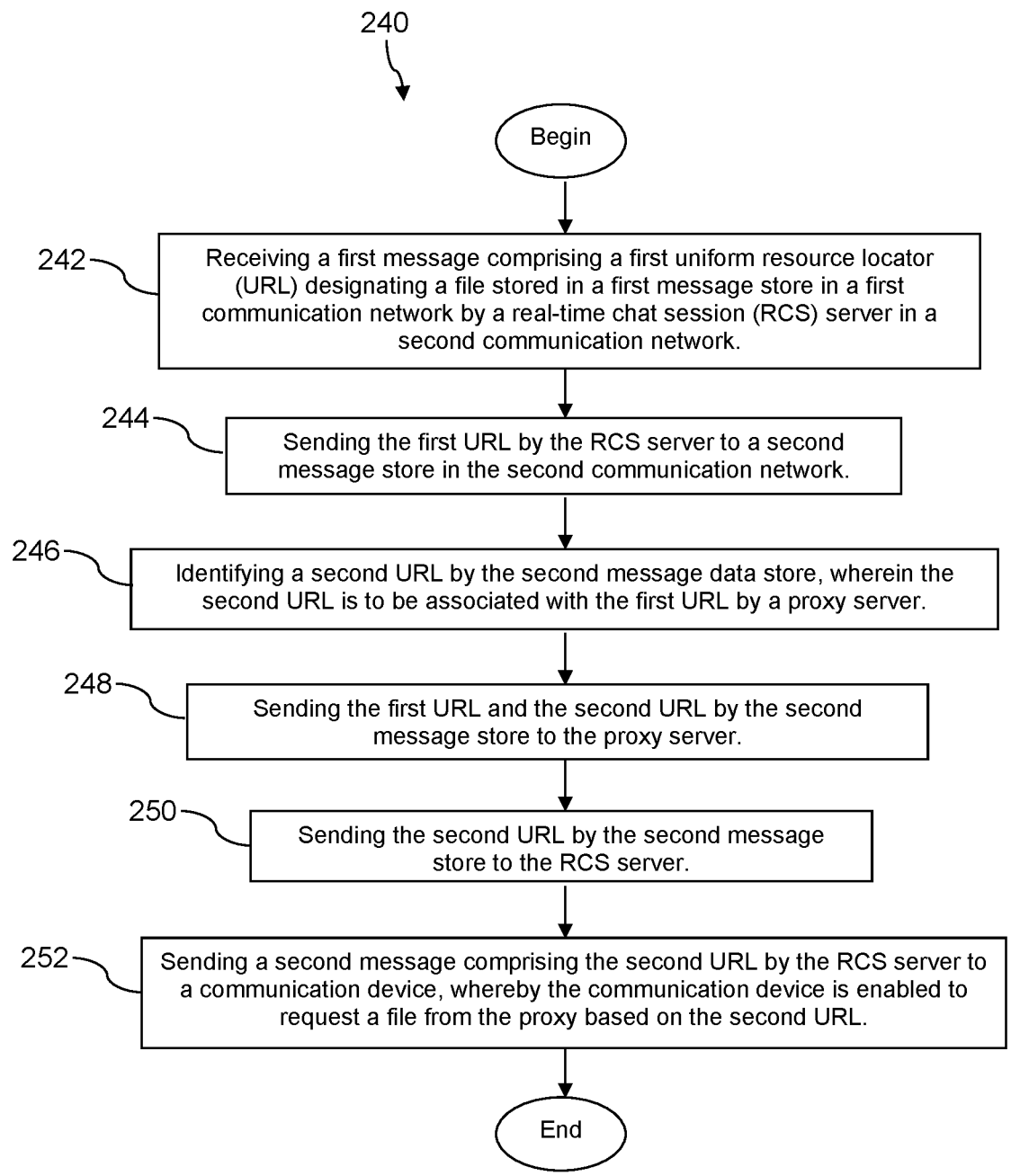
FIG. 5 is a flow chart of yet another method according to an embodiment of the disclosure.

Turning now to FIG. 5, a method 240 is described. In an embodiment, the method 240 comprises a method of completing real-time chat service (RCS) file transfer. At block 242, the method 240 comprises receiving a first message comprising a first uniform resource locator (URL) designating a file stored in a first message store in a first communication network by a real-time chat session (RCS) server in a second communication network. In an embodiment, the first message is a message session relay protocol message. In an embodiment, the RCS server in the second communication network receives the first message from an RCS server in the first communication network via a hub node (e.g., hub 140 described with reference to FIG. 2 above).

At block 244, the method 240 comprises sending the first URL by the RCS server to a second message store in the second communication network. At block 246, the method 240 comprises identifying a second URL by the second message store, wherein the second URL is to be associated with the first URL by a proxy server. In an embodiment, the processing of block 246 further comprises determining a time-out value to be associated with the second URL.

At block 248, the method 240 comprises sending the first URL and the second URL by the second message store to the proxy server. In an embodiment, the processing of block 248 comprises sending the time-out value along with the first URL and the second URL to the proxy server. At block 250, the method 240 comprises sending the second URL by the second message store to the RCS server. At block 252, the method 240 comprises sending a second message comprising the second URL by the RCS server to a communication device, whereby the communication device is enabled to request a file from the proxy based on the second URL. In an embodiment, the communication device is a mobile phone, a smart phone, a personal digital assistant (PDA), a wearable computer, a headset computer, a laptop computer, a notebook computer, or a tablet computer. In an embodiment, the communication device receives wireless communication service from the second communication network.

Figure 6:
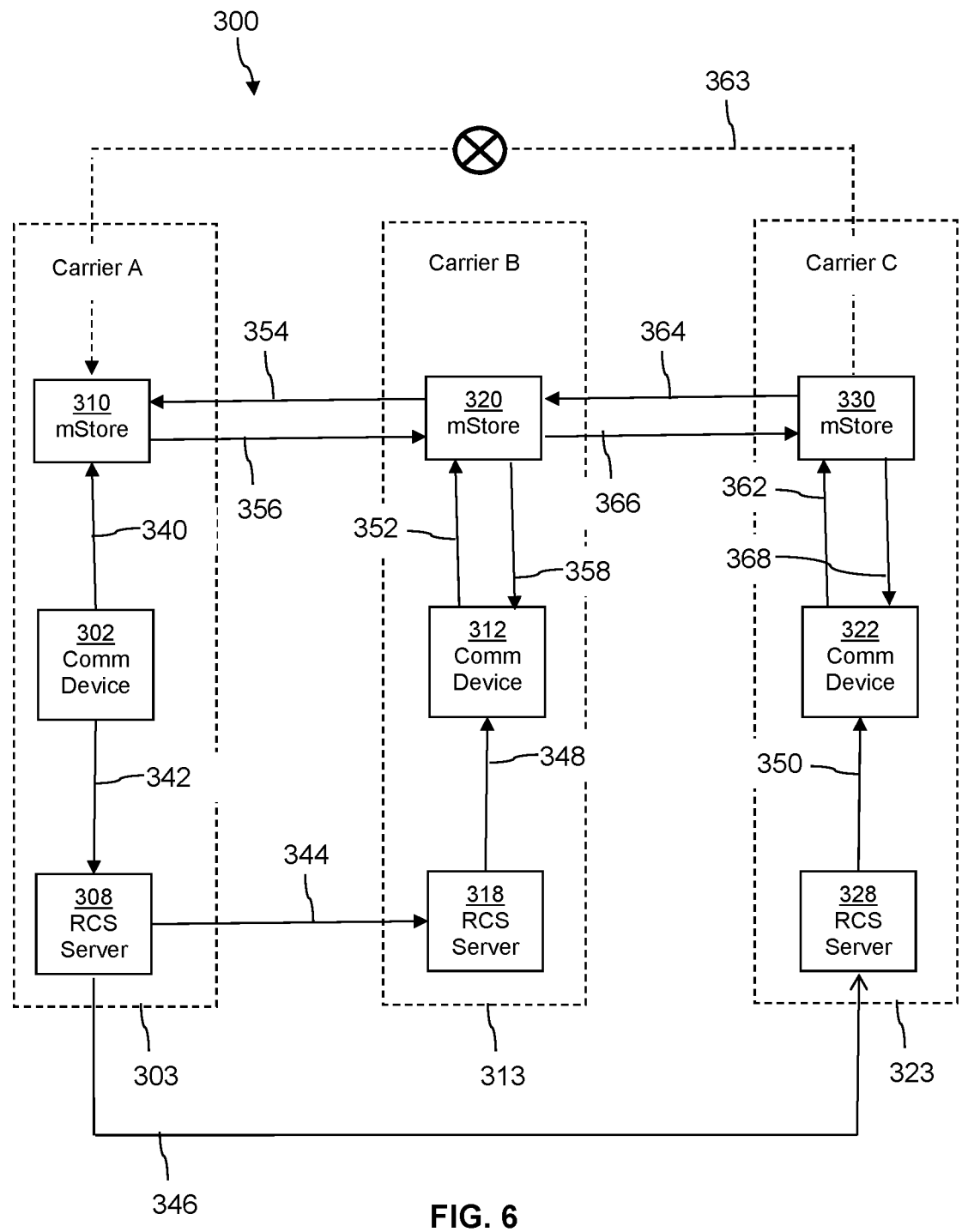
FIG. 6 is a block diagram of a communication system according to an embodiment of the disclosure.

Turning now to FIG. 6, a system 300 is described. In an embodiment, the system 300 is substantially similar to the system 100 described above with reference to FIG. 1, but with the difference that in system 300 there is no proxy server 130 and a different approach to file sharing is used as described below. In an embodiment, the system 300 comprises a first communication device 302 receives wireless communication service from a carrier A 303, a second communication device 312 receives wireless communication service from a carrier B 313, and a third communication device 322 receives wireless communication service from a carrier C 323. The first communication device 302 may be provided a wireless communication link by a cell site of the carrier A 303 according to a 5G, a long-term evolution (LTE), a code division multiple access (CDMA), or a global system for mobile communications (GSM) telecommunication protocol. The second communication device 312 may be provided a wireless communication link by a cell site of the carrier B 313 according to a 5G, an LTE, a CDMA, or a GSM telecommunication protocol. The third communication device 322 may be provided a wireless communication link by a cell site of the carrier C 323 according to a 5G, an LTE, a CDMA, or a GSM telecommunication protocol.

The communication devices 302, 312, 322 are engaged in a real-time chat session. The first communication device 302 sends a message 340 comprising a file that it wishes to share with the second and third communication devices 312, 322 to the first mStore 310, whereby the file is stored in the first mStore 310. The first communication device 302 sends a message 342 identifying the file stored in the mStore 310 with a URL to the RCS server 308. The RCS server 308 sends a message 344 containing the URL to the RCS server 318 of the carrier B 313 and a message 346 containing the URL to the RCS server 328 of the carrier C 323.

The RCS server 318 of the carrier B 313 sends a message 348 containing the URL to the second communication device 312. The second communication device 312 sends a message 352 containing the URL to the mStore 320 of the carrier B 313 requesting the subject file. The mStore 320 sends a message 354 based on the URL to the mStore 310 requesting the file. The mStore 310 sends a message 356 containing the file to the mStore 320. The mStore 320 stores the file and sends a copy of the file in message 358 to the second communication device 312. The second communication device 312 may present the file on a display screen to a user. Alternatively, the RCS server 318 of the carrier B 313 sends a message containing the URL to the mStore 320 of the carrier B 313, the mStore 320 retrieves the file from the mStore 310, the mStore 320 stores the file and creates a URL associated with the file it has stored (e.g., a URL local to the carrier B 313), and returns this local URL to the RCS server 318. The RCS server 318 sends the local URL to the second communication device 312. The second communication device 312 uses this local URL to retrieve the file from the mStore 320.

The RCS server 328 of the carrier C 323 sends a message 350 containing the URL to the third communication device 322. The third communication device 322 sends a message 362 containing the URL to the mStore 330 of the carrier C 323 requesting the subject file. The mStore 330 sends a message 363 containing the URL to the mStore 310, but in this case the mStore 330 has no connection to the mStore 310, hence the message 363 fails. This lack of connection may be a temporary outage. Alternatively, there may be no agreement between the carrier A 303 and the carrier C 323 to allow communication between the mStores 310, 330, and the message 363 fails due to this lack of agreement. In an embodiment, the connections between mStores 310, 320, 330 may be configured between collaborating carriers and may not be configured if no such collaboration has been established.

In response to the failure of message 363, the mStore 330 sends a message 364 containing the URL to the mStore 320. Because the mStore 320 does have a communication path to the mStore 310 and has already downloaded the subject file, the mStore 320 sends message 366 containing the file to the mStore 330. The mStore 330 sends message 368 containing the file to the third communication device 322. The third communication device may present the file on a display to a user.

Alternatively, the RCS server 328 of the carrier C 323 sends a message containing the URL to the mStore 330 of the carrier C 323, and the mStore 330 attempts to retrieve the file from the mStore 310 but fails for the reason described above. The mStore 330 then attempts to retrieve the file from the mStore 320, receives the file, stores the file, and creates a URL associated with the file it has stored (e.g., a URL local to the carrier C 323), and returns the local URL to the RCS server 328. The RCS server 328 sends the local URL to the third communication device 322. The third communication device 322 uses this local URL to retrieve the file from the mStore 330 and presents the file on a display to a user.

Figure 7:
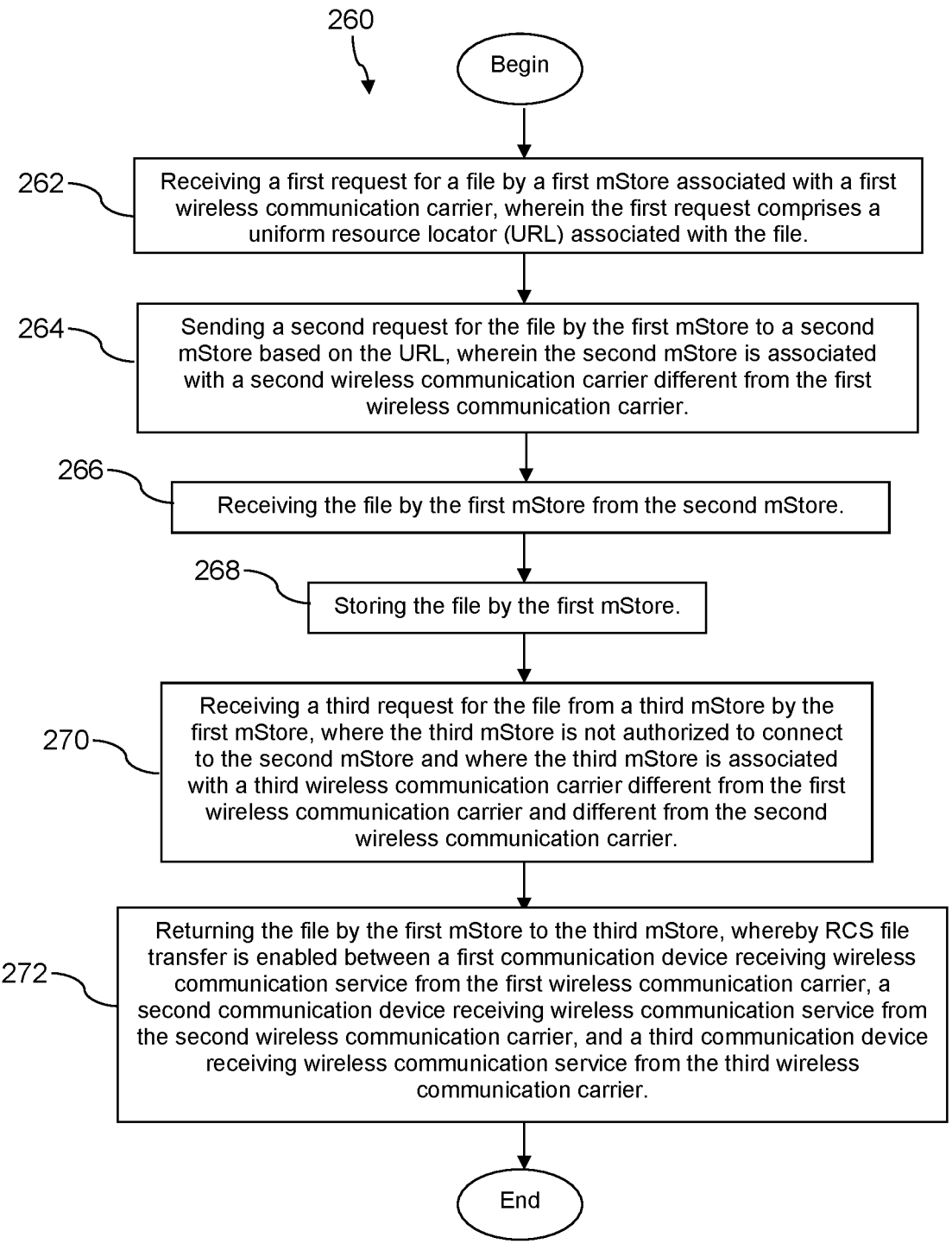
FIG. 7 is a flow chart of a method according to an embodiment of the disclosure.

Turning now to FIG. 7, a method 260 is described. In an embodiment, method 260 is a method of completing real-time chat service (RCS) file transfer. At block 262, the method 260 comprises receiving a first request for a file by a first mStore associated with a first wireless communication carrier, wherein the first request comprises a uniform resource locator (URL) associated with the file. In an embodiment, the file is greater than 80 MB in size.

At block 264, the method 260 comprises sending a second request for the file by the first mStore to a second mStore based on the URL, wherein the second mStore is associated with a second wireless communication carrier different from the first wireless communication carrier. At block 266, the method 260 comprises receiving the file by the first mStore from the second mStore. At block 268, the method 260 comprises storing the file by the first mStore.

At block 270, the method 260 comprises receiving a third request for the file from a third mStore by the first mStore, where the third mStore is not authorized to connect to the second mStore and where the third mStore is associated with a third wireless communication carrier different from the first wireless communication carrier and different from the second wireless communication carrier.

At block 272, the method 260 comprises returning the file by the first mStore to the third mStore, whereby RCS file transfer is enabled between a first communication device receiving wireless communication service from the first wireless communication carrier, a second communication device receiving wireless communication service from the second wireless communication carrier, and a third communication device receiving wireless communication service from the third wireless communication carrier. In an embodiment, the first communication device is a mobile phone, a smart phone, a personal digital assistant (PDA), a wearable computer, a headset computer, a laptop computer, a notebook computer, or a tablet computer; the second communication device is a mobile phone, a smart phone, a PDA, a wearable computer, a headset computer, a laptop computer, a notebook computer, or a tablet computer; and the third communication device is a mobile phone, a smart phone, a PDA, a wearable computer, a headset computer, a laptop computer, a notebook computer, or a tablet computer. In an embodiment, the first communication device is provided a wireless communication link by a cell site of the first wireless communication carrier according to a 5G, a long-term evolution (LTE), a code division multiple access (CDMA), or a global system for mobile communications (GSM) telecommunication protocol, the second communication device is provided a wireless communication link by a cell site of the second wireless communication carrier according to a 5G, an LTE, a CDMA, or a GSM telecommunication protocol, and the third communication device is provided a wireless communication link by a cell site of the third wireless communication carrier according to a 5G, an LTE, a CDMA, or a GSM telecommunication protocol.

In an embodiment, the method 260 further comprises the second wireless communication device sending a message containing the file to the second mStore, whereby the second mStore stores the file. In an embodiment, the first communication device sends the first request for the file to the first mStore and the method 260 further comprises sending the file by the first mStore to the first communication device and presenting the file on a display of the first communication device. In an embodiment, the method 260 further comprises sending a fourth request for the file by the third mStore to the second mStore and determining that the second mStore is unreachable by the third mStore, whereby the third mStore is triggered to send the third request for the file to the first mStore.

Figure 8A:
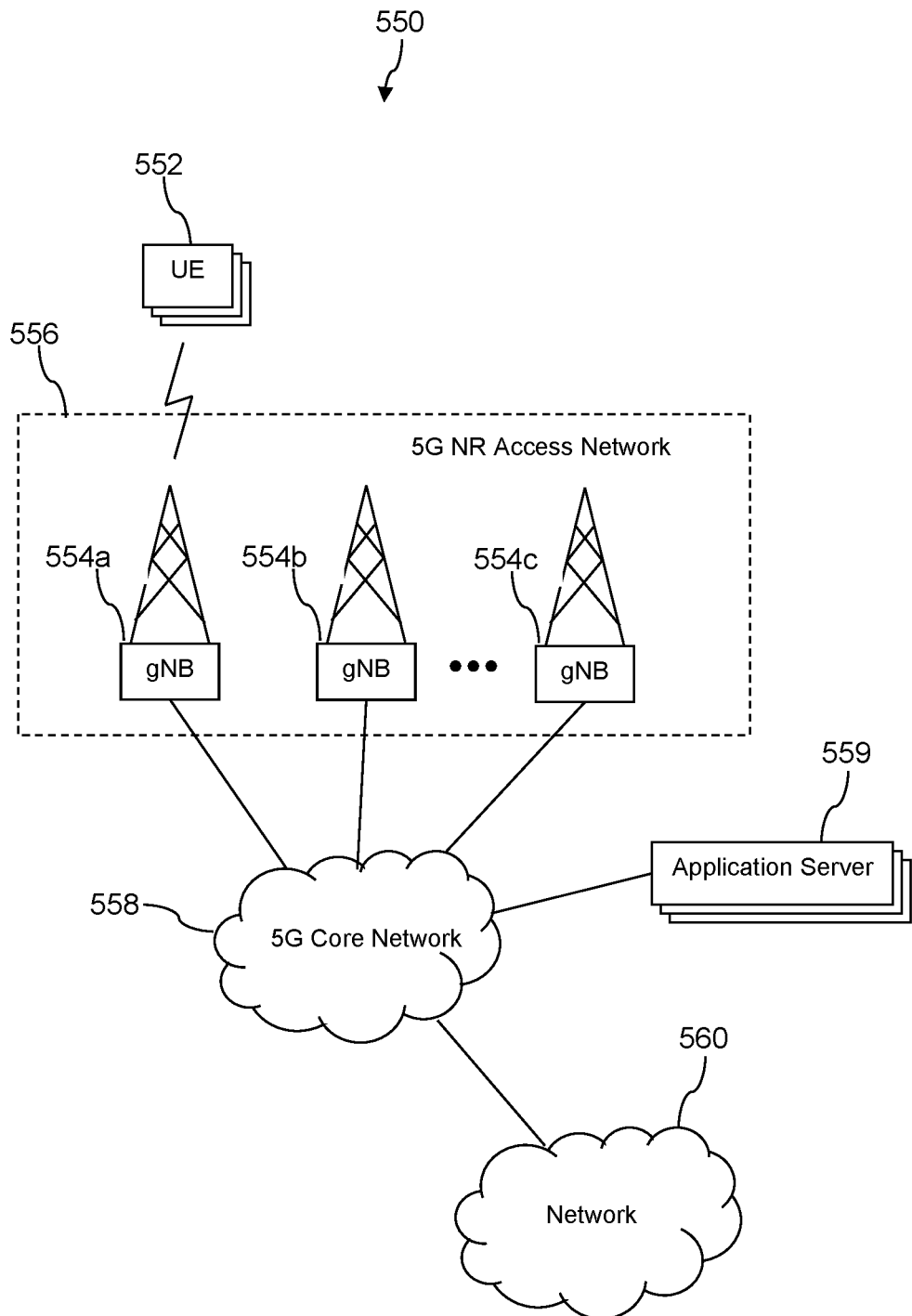
FIG. 8A and FIG. 8B are a block diagram of a 5G communication system according to an embodiment of the disclosure.

Turning now to FIG. 8A, an exemplary communication system 550 is described. Typically the communication system 550 includes a number of access nodes 554 that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a next Generation Node B (gNB). In 4G technology (e.g., long term evolution (LTE) technology) an access node 554 may be referred to as an evolved Node B (eNB). In 3G technology (e.g., code division multiple access (CDMA) and global system for mobile communication (GSM)) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"— such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and sub-carrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 8B:
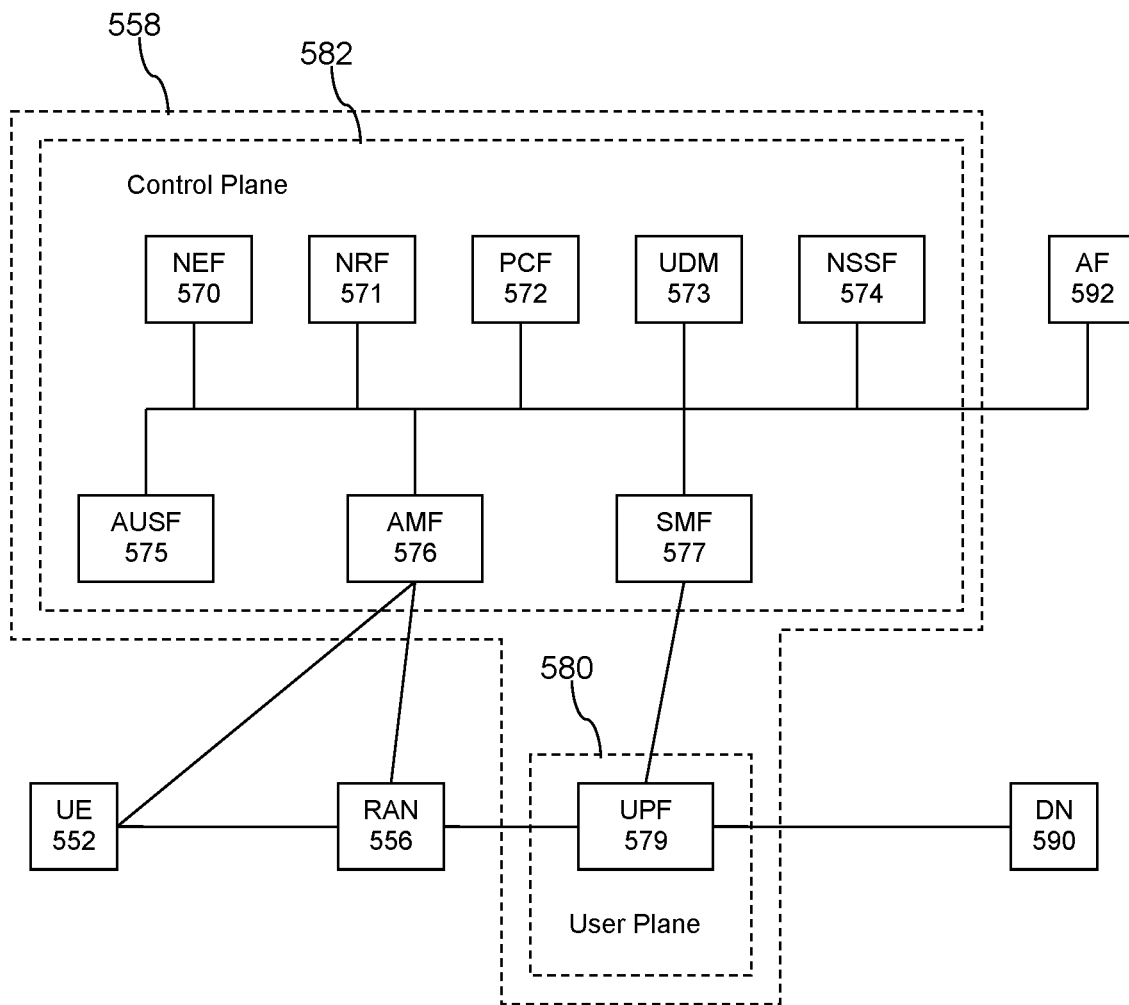

Turning now to FIG. 8B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 8A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow-based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 9:
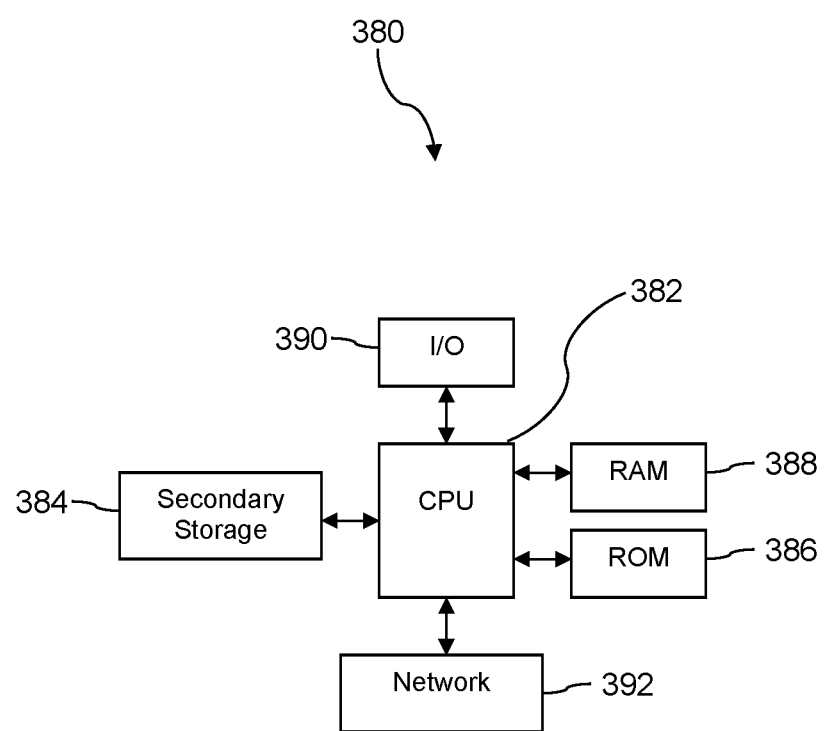
FIG. 9 is a block diagram of a computer system according to an embodiment of the disclosure.

FIG. 9 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

ADDITIONAL DISCLOSURE

The following are non-limiting, specific embodiments in accordance with the present disclosure.

A first embodiment, which is a method of completing real-time chat service (RCS) file transfer, comprising receiving a first uniform resource locator (URL) designating a file stored in a first message store in a first communication network by a second message store in a second communication network; sending the first URL by the second message store to a proxy server; creating a mapping from a second URL to the first URL by the proxy server; storing the mapping from the second URL to the first URL by the proxy server; receiving a request for a file transfer by the proxy server from a communication device engaged in a real-time chat session, wherein the request comprises the second URL; in response to receiving the request for the file transfer, looking up the first URL by the proxy server based on the second URL; retrieving a file stored at the first message store by the proxy server based on the first URL; and returning the retrieved file by the proxy server to the communication device engaged in the real-time chat session.

A second embodiment, which is the method of the first embodiment wherein the first communication network is a first wireless communication network and the second communication network is a second wireless communication network.

A third embodiment, which is the method of the first embodiment or the second embodiment wherein the communication device is a mobile phone, a smart phone, a personal digital assistant (PDA), a wearable computer, a headset computer, a laptop computer, a notebook computer, or a tablet computer.

A fourth embodiment, which is the method of any of the first through third embodiments further comprising receiving the first uniform resource locator (URL) designating the file stored in the first message store in the first communication network by a third message store in a third communication network; sending the first URL to the proxy server by the third message store; creating a mapping from a third URL to the first URL by the proxy server; storing the mapping from the third URL to the first URL by the proxy server; receiving a request for a file transfer by the proxy server from a second communication device engaged in a real-time chat session, wherein the request comprises the third URL; in response to receiving the request for the file transfer, looking up the first URL by the proxy server based on the third URL; retrieving the file stored at the first message store by the proxy server based on the first URL; and returning the retrieved file by the proxy server to the second communication device engaged in the real-time chat session.

A fifth embodiment, which is the method of any of the first through the fourth embodiments further comprising caching by the proxy server the file retrieved from the first message store.

A sixth embodiment, which is the method of the fifth embodiment further comprising receiving the first uniform resource locator (URL) designating the file stored in the first message store in the first communication network by a third message store in a third communication network; sending the first URL by the third message store to the proxy server; creating a mapping from a third URL to the first URL by the proxy server; storing the mapping from the third URL to the first URL by the proxy server; receiving a request for a file transfer by the proxy server from a second communication device engaged in a real-time chat session, wherein the request comprises the third URL; in response to receiving the request for the file transfer, looking up the first URL by the proxy server based on the third URL; retrieving the file from the cache by the proxy server based on the first URL; and returning the retrieved file by the proxy server to the second communication device engaged in the real-time chat session.

A seventh embodiment, which is any of the first through the sixth embodiments, further comprising receiving the first URL by an RCS server in the second communication network; sending the first URL by the RCS server to the second message store; receiving the second URL by the RCS server from the second message store; and transmitting the second URL by the RCS server to the communication device.

An eighth embodiment, which is the method of the first embodiment, wherein the proxy server generates the second URL.

A ninth embodiment, which is the method of the first embodiment, wherein the second URL is sent by the second message store to the proxy server.

A tenth embodiment, which is the method of any of the first through the ninth embodiments, wherein the second URL designates a location in a domain of the second communication network.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of completing real-time chat service (RCS) file transfer, comprising:
    receiving, by a real-time chat session (RCS) server in a second communication network, a first message comprising a first uniform resource locator (URL) designating a file stored in a first message store in a first communication network;
    sending the first URL by the RCS server to a second message store in the second communication network;
    identifying a second URL by the second message store, wherein the second URL is to be associated with the first URL by a proxy server;
    sending the first URL and the second URL by the second message store to the proxy server;
    sending the second URL by the second message store to the RCS server;
    sending a second message comprising the second URL by the RCS server to a communication device engaged in a real-time chat session, whereby the communication device is enabled to request the file from the proxy based on the second URL;
    creating a mapping from the second URL to the first URL by the proxy server;
    storing the mapping from the second URL to the first URL by the proxy server;
    receiving a request for a file transfer by the proxy server from the communication device, wherein the request comprises the second URL;
    in response to receiving the request for the file transfer, looking up the first URL by the proxy server based on the second URL;
    retrieving a file stored at the first message store by the proxy server based on the first URL; and
    returning the retrieved file by the proxy server to the communication device.

2. The method of claim 1, wherein the first message is a message session relay protocol message.

3. The method of claim 1, wherein the communication device is a mobile phone, a smart phone, a personal digital assistant (PDA), a wearable computer, a headset computer, a laptop computer, a notebook computer, or a tablet computer.

4. The method of claim 1, wherein the communication device receives wireless communication service from the second communication network.

5. The method of claim 1, further comprising sending a time-out value with the first URL and the second URL by the second message store to the proxy server.

6. The method of claim 1, wherein the RCS server in the second communication network receives the first message from an RCS server in the first communication network via a hub node.

7. The method of claim 1, wherein the file is a video file.

8. The method of claim 1, wherein the communication device is provided a wireless communication link by a cell site of the first wireless communication carrier according to a 5G, a long-term evolution (LTE), a code division multiple access (CDMA), or a global system for mobile communications (GSM) telecommunication protocol.

9. The method of claim 1, wherein the retrieved file is returned by the proxy server to the communication device without storing the retrieved file in the proxy server.

10. The method of claim 1, further comprising storing the retrieved file by the proxy server in a cache.

11. The method of claim 10, further comprising:
    receiving the first URL and a third URL by the proxy server from a third message store in a third communication network;
    creating a mapping from the third URL to the first URL by the proxy server;
    storing the mapping from the third URL to the first URL by the proxy server;
    receiving a second request for a file transfer by the proxy server from a second communication device engaged in a real-time chat session, wherein the request comprises the third URL;
    in response to receiving the second request for the file transfer, looking up the first URL by the proxy server based on the third URL;
    retrieving the file from the cache by the proxy server; and
    returning the retrieved file by the proxy server to the second communication device engaged in the real-time chat session.

12. The method of claim 11, wherein the first communication network is a first wireless network, the second communication network is a second wireless network, and the third communication network is a third wireless network.

13. The method of claim 11, wherein the second communication device is a mobile phone, a smart phone, a personal digital assistant (PDA), a wearable computer, a headset computer, a laptop computer, a notebook computer, or a tablet computer.

14. The method of claim 1, wherein the file is a video file.

15. The method of claim 1, wherein the file is greater than 80 MB in size.

16. The method of claim 1, further comprising receiving a time-out value by the proxy server along with the first URL and the second URL, wherein the mapping from the second URL to the first URL comprises the time-out value.

17. The method of claim 16, wherein the time-out value is received from the second message store.

18. The method of claim 16, further comprising:
    determining by the proxy server that the time-out value of the mapping from the second URL to the first URL has expired; and
    deleting the mapping from the from the second URL to the first URL by the proxy server.

* * * * *